Sept. 7, 1965    W. J. CALDWELL ETAL    3,205,385
ARMATURE AND METHOD OF WINDING AND CONNECTING SAME
Filed May 27, 1960    2 Sheets-Sheet 1

INVENTORS.
WASHINGTON J. CALDWELL
CLYDE I. CLARK
GERALD C. DONOVAN
BY
ATTORNEYS

Sept. 7, 1965  W. J. CALDWELL ETAL  3,205,385

ARMATURE AND METHOD OF WINDING AND CONNECTING SAME

Filed May 27, 1960  2 Sheets-Sheet 2

INVENTORS.
WASHINGTON J. CALDWELL
CLYDE I. CLARK
GERALD C. DONOVAN
BY
Falvey, Souther & Stoltenberg
ATTORNEYS

United States Patent Office 3,205,385
Patented Sept. 7, 1965

3,205,385
ARMATURE AND METHOD OF WINDING
AND CONNECTING SAME
Washington J. Caldwell, Clyde I. Clark, and Gerald C. Donovan, Toledo, Ohio, assignors to Eltra Corporation, a corporation of Ohio
Filed May 27, 1960, Ser. No. 32,321
5 Claims. (Cl. 310—203)

This invention relates to a dynamo electric machine armature and more particularly to a winding and connecting pattern for the coil windings provided an automotive generator armatures.

The invention contemplates the provision of a method of winding and connecting a generator armature, which is capable of being automated on a mass production line in which four coils can be wound simultaneously directly on the armature core and simultaneously connected to the commutator.

The invention further contemplates an armature winding and connecting pattern capable of being utilized and mechanized with automatic machinery providing an improved armature which is more economical in that less wire is used in the coils and less time is needed to wind the armature.

The invention comprehends an armature winding and connecting pattern capable of being automated whereby four coils (two coils on each half of said armature) are simultaneously wound directly on the armature core and simultaneously connected to the commutator providing a more tightly wound armature having improved electrical characteristics and better physical balance.

It is, therefore, a principal object of this invention to provide a method of automatically winding and connecting an armature which has improved electrical and physical characteristics.

Another object of the invention is to provide an armature winding and connecting pattern capable of being automated on a mass production line for winding four coils simultaneously on the armature core and connecting the leads thereof to the commutator bars.

Another object is to provide a winding pattern for generator armatures capable of being carried out in an automatic winding and connecting machine, whereby two coils can be wound directly on each diametrically-opposed half of the armature core with the trailing ends of the wound coil being connected simultaneously to their related commutator bars and connecting the leading ends of the next to be wound coils to their related commutator bars substantially simultaneously, so that four coils can be wound simultaneously directly on the armature core.

A further object is to provide a winding pattern for a generator armature using four strands to form four simultaneously-wound coils whose individual leading and trailing coil leads are automatically connected to the related commutator segments before and after each winding cycle of the four coils, the winding and connecting of the leads being correlated in a uniform sequence to allow the winding and connecting to be carried out on an automatic winding machine on a mass production line.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figure 1:
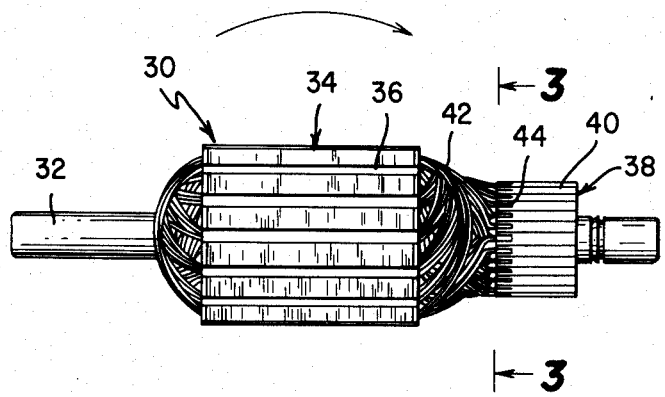
FIG. 1 is an elevational view showing a completely wound and connected generator armature incorporating the coil winding and connecting pattern disclosed in this invention.

Referring to the drawings, particularly FIG. 1, an armature 30 is shown suitable for use with automotive generators having a shaft 32 upon which is mounted a conventional laminated core assembly 34 and a conventional commutator assembly 38 comprising a number of insulated segment bars 40. The core portion 34 of the armature is provided with a number of circumferentially-spaced longitudinal slots 36 in which coil windings 42 are nested in a position parallel with the armature shaft 32. The individual commutator segments 40 are provided with slots 44 at their inner ends providing a means of connecting the coil leads thereto by a staking operation. The armature construction, as described thus far, is similar to any conventional dynamo-electric machine armature. The invention disclosed herein is related to the connecting pattern of the coil leads as related to the coil windings 42, and the method and sequence of positioning the coils on the armature core, which will now be described.

In the past, armatures for dynamo-electric machines, particularly generators, have generally utilized form-wound armature coils which were manually positioned on the armature core and the leads manually connected to the commutator. It has been the desideratum of the industry to provide methods for manufacturing generator armatures which can be carried out on automatic machinery, so that a minimum of manual labor is involved during the manufacturing process. This has, in a large measure, been carried out in the manufacturing processes presently utilized. However, no automatic machinery has been made available for manufacturing generator armatures which automatically winds the active coils in the slots of the armature core, while in the same operation connects the leads from the active coils to the related slots in the commutator. This allows the winding and connecting of the armature to continue steadily through the winding of one complete armature. A machine has been suggested for this purpose, but the winding cycle is relatively slow, so that the automatic machine has not been as economical as could be desired, although it dispenses with the manual labor of connecting the leads from the armature coils to their related commutator slots. The present invention provides a winding and connecting pattern for a generator armature which is capable of being carried out on a mass production line by an automatic winding and connecting machine. In the use of this pattern and the machine incorporating it, the core of the armature is capable of being completely wound and connected as a continuous operation.

Figure 2:
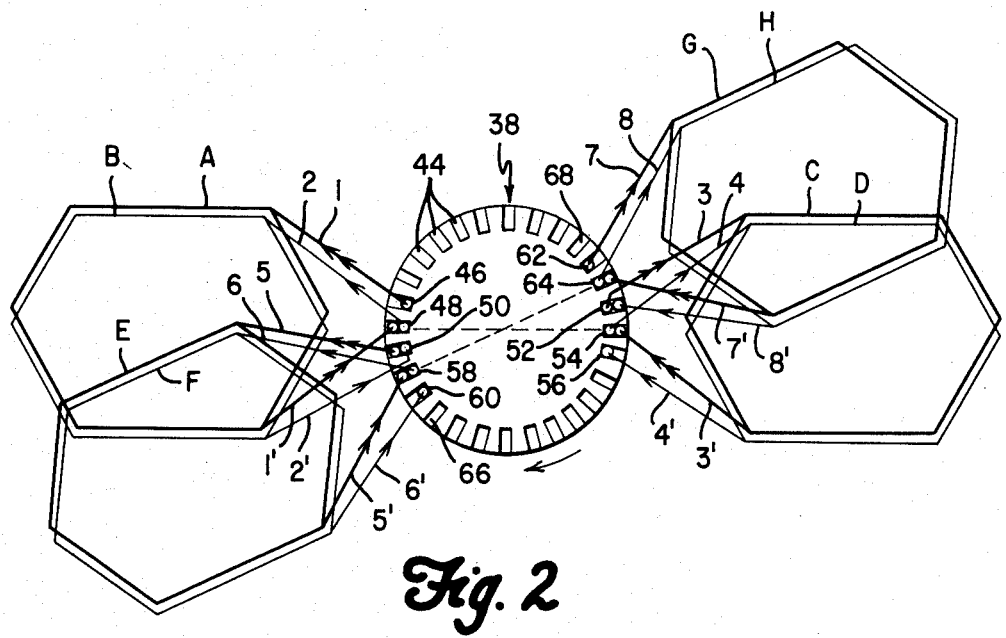
FIG. 2 is a schematic view showing details of the winding and connecting pattern incorporated in the generator armature shown in FIG. 1 after two winding cycles, positioning and connecting the first eight coils on the armature.
Figure 3:
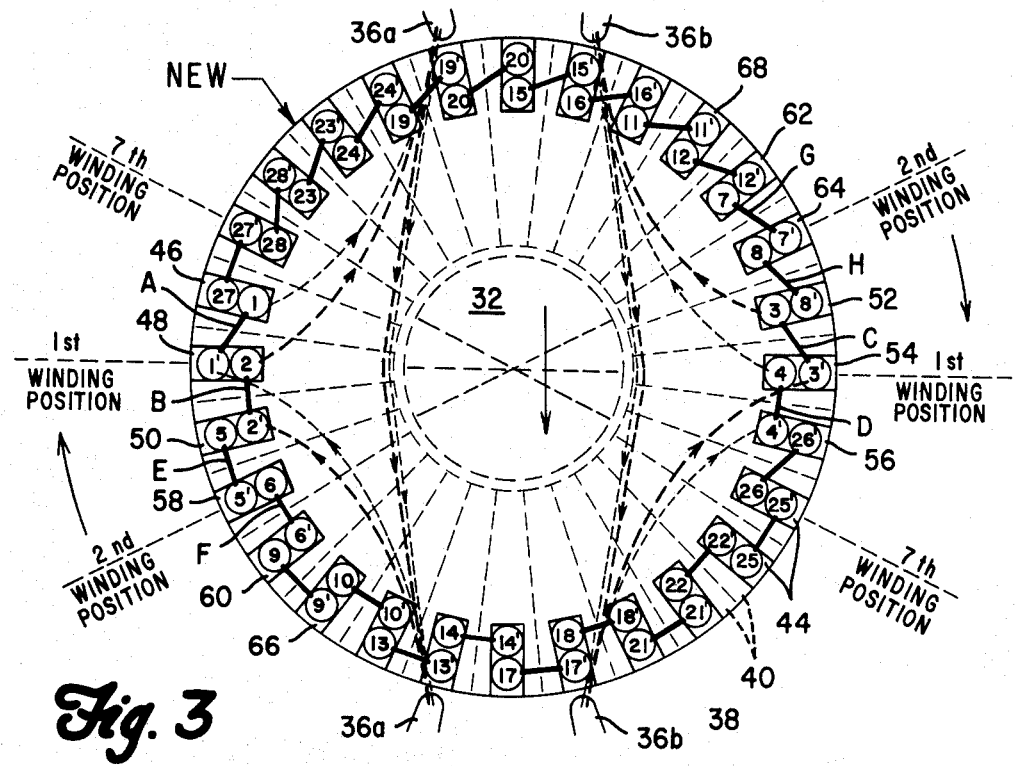
FIG. 3 is a schematic sectional view taken on line 3—3 of FIG. 1 showing a complete connecting pattern for the generator commutator and the coil leads of the armature incorporating the present invention.

In FIGS. 2 and 3 of the drawings, a pattern of connection for generator armatures is shown whereby four strands of wire can be wound simultaneously on the armature core to form four armature coils. By starting the winding cycle on diametrically-opposed sides of the commutator and the armature core, and winding two coils on each side of the armature simultaneously, the armature may be indexed progressively through 180 degrees to rotate on the armature in selected positions, so that the four strands in two pairs can be wound in adjacent slots of the armature. Provision is also made for a timed control means which will facilitate the connecting of the trailing leads of the armature coils just-wound to their related commutator slots 44 and, at the same time, to connect with the leading ends of the coils to-be-wound in adjacent commutator slots to begin a new winding cycle. For purposes of illustration, the drawings disclose an armature having fourteen core slots 36 in combination with a commutator having twenty-eight bars 40, so that the two coils being wound simultaneously on one side of the armature are positioned in the same core slot 36 but are connected to adjacent separate commutator bars 40, as shown, which involves a novel winding and connecting pattern to allow fabrication of an armature in an automatic machine.

Referring particularly to the commutator bar slots, generally indicated at 44 in FIGS. 2 and 3, a winding cycle begins by inserting the ends 1, 2, 3, and 4 of the continuous strands in bar slots 46, 48, 52 and 54, respectively, shown at opposite sides of the commutator 38. By examining the drawing, it will be seen that slots 48 and 54 are diametrically opposed from each other so as to be in a diametrical plane, while slots 46 and 52 are both positioned one slot above slots 48 and 54 so that slots 46 and 52 are on the same side of the diametrical plane, as viewed in the drawings.

After the leading ends 1, 2, 3 and 4 of the continuous strands are inserted in their respective commutator slots 44, the armature is rotated in a clockwise direction (FIG. 1) in an end-over-end fashion, so that the four wire strands will be positioned in the armature slots as indicated by the arrows shown on the coils of FIG. 2 while in FIG. 3, the coils are shown in phantom with indicating arrows. This positions two active armature coils in each of a pair of cooperating armature core slots 36a and 36b. The number of turns provided in each winding cycle to form an active armature coil is conventional and is determined by the design of the electromagnetic machine with which the armature is to be used.

At the end of the first winding cycle, the trailing ends 1', 2', 3' and 4' of the first four coils are severed from the strands and inserted in commutator bar slots 48, 50, 54 and 56, respectively. This method of winding and connecting armatures may be automatically accomplished by the use of a machine which is disclosed in Application, Serial No. 47,471, filed August 4, 1960, which incorporates a coil lead severing and inserting mechanism for the commutator of the armature.

An examination of FIG. 3 indicates that the leading ends 2 and 4 of coils B and D are positioned in the slots 48 and 54 which are positioned in diametrically-opposed relation in the diametrical plane with reference to the commutator and also in a plane transverse to the plane of the clockwise rotation in which the armature is moved during the winding of the active coils in the pairs of slots 36a and 36b. This is clearly indicated in FIG. 3 where the active coils are shown in dotted line. At the same time, the leading ends 1 and 3 of coils A and C are positioned in slots 46 and 52 of the commutator which are positioned in the adjacent bar located relatively above and on the same side of the diametrical plane of the diametrically-opposed pair of slots 48 and 54 which cooperate with the leading ends 2 and 4 of coils B and D already mentioned. The leading ends 1 and 2 of coils A and B on the left side of the commutator are positioned in their respective slots 46 and 48 by members moving along radial planes toward the center of the commutator from the left hand side (FIG. 3) while the leading ends 3 and 4 of coils C and D are positioned in slots 52 and 54 in their radial planes from the right side of the commutator by members moving from the opposite direction toward the center of the commutator. After the pairs of active coils A, B and C, D, are wound in the pairs of slots 36a and 36b, the trailing ends 1' and 2' of coils A and B and trailing ends 3' and 4' of coils C and D are held and simultaneously severed from the continuous strands and inserted in slots which are immediately below the slots in which the leading ends of the same coils have been connected. The trailing ends 2' and 4' of coils B and D are, therefore, connected to slots 50 and 56 immediately below the slots 48 and 54 which are positioned on a horizontal diametrical plane passing through the center of the commutator the slots 50 and 56 are therefore on the same side of the diametrical plane but on the opposite side from slots 46 and 52. The trailing ends 1' and 3' of coils A and C are connected to commutator slots 48 and 54 on the diametrical plane immediately below the commutator slots 46 and 52 on the upper or first side of the diametrical plane in which the leading ends of the same coil are connected.

The new free ends of the four strands in the meanwhile are held by the mechanism during the period in which the armature is rotated one armature slot in a clockwise direction (FIGS. 2 and 3) relative to the first winding position, so that the commutator is also rotated in the same direction a distance of two bars. This rotation causes the slots 58 and 64 to be moved into the horizontal position which the slots 48 and 54 occupied in the first winding cycle. The new slots 58 and 64, of course, are in diametrically-opposed relation the same as the previous slots 48 and 54. The new free ends of the four strands are then positioned in their slots in the same relation as before, so that lead 5, which is the leading end of a new coil E, will be positioned in slot 50 superposed on trailing end 2', while the leading end 7 of the opposite coil G will be positioned in the bottom of slot 62. The leading end 6 of the second coil F on the left will be positioned in the bottom of slot 58 and the leading end 8 of the opposite coil H will be positioned in the bottom of slot 64. With the leading ends 5, 6, 7 and 8 of the new coils being connected to the commutator, a new winding cycle begins. After the winding is completed, the severing and connecting of the trailing ends 5', 6', 7' and 8' of the new coils will follow the same pattern already described, in that the trailing ends will be connected to the commutator bar immediately below that to which its respective leading end is connected.

To clearly outline this new situation, trailing lead 5' of coil E is connected to commutator slot 58 superposed on lead 6, and trailing lead 6' of coil F is connected to the bottom of commutator slot 60 on the left side of the commutator. On the right side of the commutator, trailing lead 7' of coil G is connected to slot 64 superposed on lead 8, and trailing lead 8' of coil H is connected to slot 52 superposed on lead 3. In the winding position for the second coil, as pointed out hereinbefore, slots 58 and 64 of the commutator are located in the horizontal plane by the clockwise rotation of the armature core and commutator at the beginning of the new winding cycle. Commutator slots 60 and 52 are positioned one slot below the horizontal plane just mentioned. In this way, a consistent winding pattern is provided which allows the method of winding to be automated in a machine which completely winds and connects an armature by winding two pairs of active coils on each side of the armature from four continuous strands and at the beginning and at the end of each winding cycle, the four leading ends and the four trailing ends are connected to the commutator by utilizing the aforementioned pattern. The armature disclosed herein is provided with 28 active coils which are positioned in pairs in fourteen slots (seven pairs) in the armature core and the ends thereof are connected to the twenty-eight commutator bars in pairs as shown clearly in FIGS. 2 and 3.

The fourteen slots in the armature core are provided with active coils which are positioned in seven related pairs of slots, so that seven winding positions are required to wind the coils in the slots of the armature core and to connect their ends to the twenty-eight commutator bars, as pointed out hereinbefore. In FIG. 3, winding positions 1, 2, and 7 are indicated. This clockwise rotation of the armature core and commutator through all seven winding positions rotates the core and commutator through an angle of 180 degrees. In the seventh winding position, leading ends 25, 26, 27, and 28 of the four continuous strands are positioned in slots of the commutator following the same pattern which has been outlined hereinbefore. Trailing coil end 26' on the right side of the commutator is positioned in superposed relation over trailing coil end 4' of coil D in commutator slot 56, while on the left side of the commutator leading end 27 is positioned in superposed relation over the leading end 1 of coil A in commutator slot 46 and trailing coil end 27' is placed in superposed position over leading end 28, which completes the connecting process for the commutator.

It will be noted that the relation between the positions in the commutator slots of the leading and trailing ends of the respective coils is not the same on opposite sides of the commutator. On the upper side of the commutator, which is connected on the right side, as shown in FIG. 3, the leading ends of the coils are uniformly positioned in the bottom of the slots 44 in the various commutator bars, while the trailing ends are positioned in superposed relation in the commutator slot with respect to the leading end of another coil. This is true excepting for the leading ends of the first coils which are connected to a fresh commutator with all bar slots unoccupied, so that these ends must be positioned in the bottom of the slots. On the lower side of the commutator, which is connected on the left side of FIG. 3, the leading and the trailing ends of alternate coils are positioned either in the bottom of the slot or in superposed relation as is clearly shown in the figure of the drawings. This again holds true in substantially all the slots excepting those which are connected at the beginning and at the end of the winding cycle.

Figure 4:
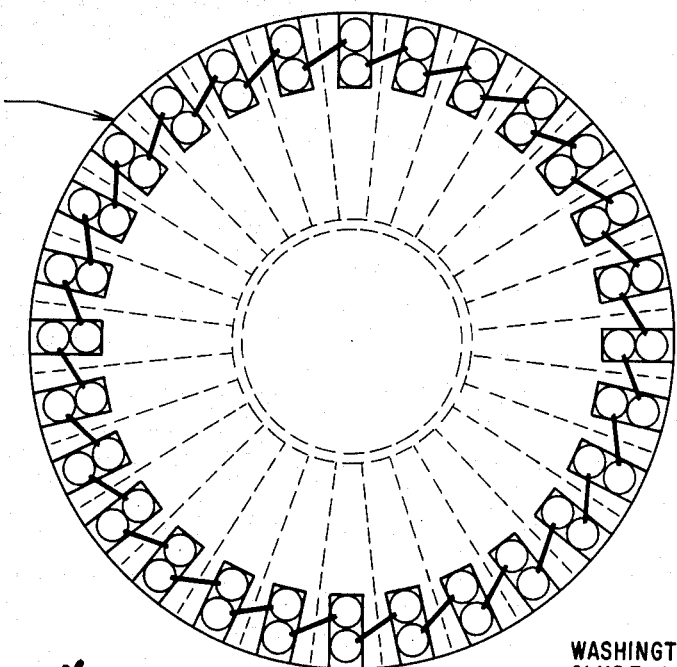
FIG. 4 is a view similar to FIG. 3 showing the conventional coil lead connecting pattern for the commutator.

In FIG. 4 of the drawings, the pattern of connecting leads at the commutator of a conventional winding is shown to illustrate the prior art. This is in general the pattern which is used when the coils are wound directly in the slots of the armature core, or in an alternative method in which the armature coils are prewound and then positioned in nesting relation in the slots of the armature core with the connections to the commutator in both cases being made by manual processes. It is not believed that the connecting pattern shown in FIG. 4 is suitable or capable for being carried out in an automatic machine.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:
1. The method of winding and connecting an armature assembly including a commutator suitable for use with a dynamoelectric machine capable of being mechanized by an automatic machine, comprising using for continuous strands, two for each side of the armature, connecting the ends of the four strands to commutator bars, the first two of which are diametrically opposed, the second two bars being adjacent the first two and on the same side relative to the first two bars, winding the four strands having their ends connected to the commutator in pairs in adjacent related slots in the armature core to form active armature coils, severing the coils just wound from the continuous strands and connecting the trailing ends of the first two coils whose leading ends are connected to the diametrically-opposed bars of the commutator to the adjacent commutator bars positioned on the opposite side relative to the second two bars, connecting the trailing ends of the second two coils to the commutator bars diametrically-opposed, indexing the armature core for movement of one armature core slot relative to the first winding position which moves the commutator a distance of two bars, connecting the new free ends of the continuous strands in the same relation as before to the new commutator bars, winding the four strands on the armature to begin a new winding cycle, and continuing the winding and connecting pattern until the armature is completed.

2. The method of winding and connecting an armature assembly including a commutator suitable for use with a dynamoelectric machine, said method being suitable for mechanization on an automatic machine, comprising using four continuous strands of wire, two for each side of the armature, connecting the ends of the four strands to related commutator bars, the first two of which are diametrically-opposed, the second two bars being adjacent to the first two commutator bars and on the same side relative to the first two bars, winding the four strands having their ends connected to the commutator in pairs in adjacent slots in the armature core by an end-over-end rotation of the armature core to form active armature coils, stopping the rotation of the armature core after a predetermined number of revolutions, severing the coils just wound from the continuous strands and connecting the trailing ends of the first two coils whose leading ends are connected to the diametrically-opposed bars of the commutator to the adjacent commutator bars on each side of the commutator on the opposite side relative to the second two commutator bars, connecting the trailing ends of the second two coils to the commutator bars diametrically-opposed, indexing the armature core clockwise for movement of one armature core slot relative to the first winding position which moves the commutator a distance clockwise of two bars, connecting the new free ends in the same relation as before to the new commutator bars, and rotating the armature to begin a new winding cycle.

3. The method of winding and connecting an armature assembly having a commutator suitable for use with a dynamoelectric machine, said method being suitable for machanization on an automatic machine, comprising using four continuous wire strands, two for each side of the armature, connecting the ends of a first pair of the four strands to diametrically-opposed commutator bars on the commutator, connecting the ends of the second pair of the continuous strands to adjacent commutator bars positioned on the same side relative to the diametrically-opposed bars, winding the four strands having their ends connected to the commutators in pairs in related adjacent slots in the armature core, severing the coils just wound from the continuous strands and connecting the trailing ends of the coils formed from the first pair of strands to adjacent commutator bars on each side positioned opposite to the commutator bars connected to the leading ends of the second pair of strands relative to the aforementioned diametrically-opposed bars, connecting the trailing ends of the second pair of coils to the commutator bars diametrically-opposed, indexing the armature core for movement of one armature core slot relative to the first winding position which moves the commutator a distance of two bars, connecting the new free ends of the strands in the same relation as before to the new commutator bars, winding the coils to begin a new winding cycle, and continuing the steps until the armature is completely wound and connected.

4. The method of winding an armature assembly suitable for use with a dynamoelectric machine including making connections to a bar type commutator, comprising using four continuous wire strands, two for each side of the armature cooperating with a commutator segment of three adjacent bars on each side of the commutator, connecting the ends of the four strands to adjacent commutator bars, the first two of which are diametrically-opposed, the second two bars being both positioned relatively on the same side circumferentially of the first two, winding the four strands having their ends connected to the commutator in pairs in adjacent pairs of related slots in the armature core by an end-over-end rotation of the armature core to form active armature coils, stopping the rotation of the armature core after a predetermined number of revolutions, severing the coils just wound from the continuous strands and connecting the trailing ends of the armature coils whose leading ends are connected to the diametrically-opposed bars of the commutator to the third adjacent commutator bars of the commutator segment positioned circumferentially opposite the second bars, connecting the trailing ends of the other two armature coils to the commutator bars diametrically-opposed, indexing the armature core clockwise for relative movement of one armature core slot relative to the first winding position which moves the commutator a distance clockwise of two bars, connecting the new free ends of the four strands in the same relation as before to the new commutator bars, and rotating the armature to begin a new winding cycle.

5. A winding and connecting pattern to facilitate the fabrication of an armature for an electromagnetic machine, including a slotted core and a commutator with kerfed bars by an automatic machine when four coils are wound simultaneously on the armature core, two each on diametrically-opposite sides of said core; the beginning lead of each coil being connected to a commutator bar of said armature and the trailing lead of each coil being connected to an adjacent commutator bar; said pattern providing that half of the commutator bars are connected to a beginning and trailing lead of half of the coils by having the leads of a given coil located in inner and outer positions in the kerfs of adjacent commutator bars in an alternating fashion with relation to the remaining said half of the coils; the remaining half of the commutator bars are connected to the remaining coils by having the beginning leads of the coils located in an inner position in the kerfs of said commutator bars and the trailing leads of the coils located in an outer position in the kerfs of the bars.

References Cited by the Examiner

UNITED STATES PATENTS

| | | | |
|---|---|---|---|
| 587,868 | 8/97 | Short | 310—233 |
| 1,685,752 | 9/28 | Powell | 310—195 |
| 2,483,024 | 9/49 | Roters | 29—155.53 |
| 2,503,752 | 4/50 | Malchus | 310—206 |
| 2,552,863 | 5/51 | Petit | 310—195 |
| 2,763,916 | 9/56 | Korski | 29—155.53 |
| 3,126,618 | 3/64 | Sharrow et al. | 29—155.53 |

MILTON O. HIRSHFIELD, *Primary Examiner.*

DAVID X. SLINEY, ORIS L. RADER, *Examiners.*